(12) United States Patent
Melz et al.

(10) Patent No.: US 7,770,391 B2
(45) Date of Patent: Aug. 10, 2010

(54) DEVICE FOR EFFECTING A BI-DIRECTIONAL DISPLACEMENT OF A MEANS ALONG A GUIDE

(75) Inventors: Tobias Melz, Darmstadt (DE); Björn Seipel, Florstadt (DE)

(73) Assignee: Fraunhofer-Gesellschaft zur Forderung der Angewandtwn Forschung E.V., Munich (DE)

( * ) Notice: Subject to any disclaimer, the term of this patent is extended or adjusted under 35 U.S.C. 154(b) by 19 days.

(21) Appl. No.: 11/909,186

(22) PCT Filed: Mar. 21, 2006

(86) PCT No.: PCT/EP2006/002608

§ 371 (c)(1),
(2), (4) Date: Jun. 6, 2008

(87) PCT Pub. No.: WO2006/100049

PCT Pub. Date: Sep. 28, 2006

(65) Prior Publication Data

US 2008/0264120 A1   Oct. 30, 2008

(30) Foreign Application Priority Data

Mar. 24, 2005  (DE) .................. 10 2005 014 288
Apr. 29, 2005  (DE) .................. 10 2005 020 126

(51) Int. Cl.
*F01B 29/10* (2006.01)
*F02G 1/04* (2006.01)
*E05B 15/02* (2006.01)

(52) U.S. Cl. ..................... 60/527; 60/528; 60/529; 292/340; 292/DIG. 66

(58) Field of Classification Search ........... 60/527–529; 285/339, 373; 249/178–180; 292/1, 137, 292/302
See application file for complete search history.

(56) References Cited

U.S. PATENT DOCUMENTS 4,087,971 A   5/1978   Hart (Continued)

FOREIGN PATENT DOCUMENTS

DE   24 13 685   3/1974

(Continued)

OTHER PUBLICATIONS

Patent Abstracts of Japan, vol. 1995, No. 10, Nov. 30, 1995 & JP 07 167037 (Sanki Eng. Co. Ltd.); others: 02), Jul. 4, 1995 abstract; figures 1,4.

*Primary Examiner*—Thomas E Denion
*Assistant Examiner*—Christopher Jetton
(74) *Attorney, Agent, or Firm*—Antonelli, Terry, Stout & Kraus, LLP.

(57) ABSTRACT

The invention relates to a device for a bi-directional displacement of a means or a connecting element, along a guide, which can be reversibly moved between at least two positions along the guide, with a means for driving that can be engaged with the means or connecting element, which is capable along the guide to displace the means or connecting element in a direction while being subjected to force and an actuator engaged with the means or connecting element, which is capable of displacing the means or connecting element in the opposite direction along the guide while being subjected to the force and wherein the actuator is actuatable by a converter material.

17 Claims, 6 Drawing Sheets

U.S. PATENT DOCUMENTS

| | | | |
|---|---|---|---|
| 4,811,564 A * | 3/1989 | Palmer | 60/527 |
| 5,070,697 A * | 12/1991 | Van Zeggeren | 60/527 |
| 5,629,662 A * | 5/1997 | Floyd et al. | 337/36 |
| 6,008,992 A * | 12/1999 | Kawakami | 361/726 |
| 6,124,662 A * | 9/2000 | Maness | 310/307 |
| 7,331,616 B2 * | 2/2008 | Brei et al. | 292/100 |

FOREIGN PATENT DOCUMENTS

| | | |
|---|---|---|
| DE | 44 06 771 C2 | 9/1995 |
| DE | 4406771 A1 * | 9/1995 |
| DE | 4406771 C2 * | 2/1997 |
| DE | 200 02 915 U1 | 1/2000 |
| WO | WO 03/093615 A1 | 11/2003 |
| WO | WO 2005/026592 A2 | 3/2005 |

* cited by examiner

DEVICE FOR EFFECTING A BI-DIRECTIONAL DISPLACEMENT OF A MEANS ALONG A GUIDE

BACKGROUND OF THE INVENTION

1. Field of the Invention

The invention relates to a device for effecting a bi-directional displacement of a means or a connecting element, hereinafter referred to as means, along a guide, which can be reversibly moved along the guide between at least two positions, with a driving means, which can be engaged with the means to displace, while being subjected to the action of force, in a direction along the guide, and an actuator which is engaged with the means and which is capable of displacing while being subjected to the action of force, in the opposite direction along the guide, wherein the actuator can be actuated by means of a converter material.

2. Description of the Prior Art

Locking mechanisms are fundamentally divisible into systems producing a rigid non-reversible connection between two components or a reversible connection, that is unlockable locking systems, serving to establish non-positive connections between two components. The further embodiments relate more preferably to connecting or locking mechanisms of the second type mentioned above by means of which it is possible to establish a reversibly fixed connection between two bodies or components which are mounted in a movable manner relative to each other.

When two components to be joined, reversibly fixed locking mechanisms provide mechanical bearing points between which are established a connection that can be subjected to mechanical load. In the simplest of cases a mechanical connecting element is provided on the bearing point of a component, which through appropriate actuation is displaced in the region of the bearing point of the other component, on which the connecting means enters into a joined connection. For example reference is made here to a pin connection with a pin that can be moved in a linear manner which is guided within a component which for example is mounted in a hinged manner relative to a second component. The second component in contrast provides a cylindrical recess adapted to the outer contour of the pin in which the bolt can be inserted through suitable displacement. If in a so-called open position the bolt is completely located in the first component, it is possible to freely swivel at least the first component relative to the second component along a predeterminal swivel axis. In the locked state of both components relative to each other, the bolt is extended in a defined relative orientation of both components relative to each other and terminates in the corresponding recess of the opposite component. Both components are thus locked against each other. If the bolt is again transferred into a rearward position, free swiveling at least of one component relative to the other component is again possible.

To actuate the above locking mechanism, that is to realize the linear mechanism driving the bolt, different driving types known per se are possible, for example a motor drive which via a gear mechanism is capable of displacing the bolt which is capable of being moved in a linear manner depending on the movement direction through changing over the direction of rotation, or an acceleration mechanism subjected to a spring force which, through a triggering moment, for example suddenly releases the energy stored in a spring for driving the bolt and transfers the bolt into a locked state. To release the bolt connection again however an outer mechanical introduction of force is required to return the bolt into its original position against the force of the spring.

If there is a desire for locking and unlocking operations which occur very rapidly in respect of time which take place comparatively in an explosion-like manner, that is in a very short time, huge technical efforts have to be made to suitably modify actuator systems known to date which are required for the linear mobility of an aforementioned bolt. In the case of a motor-driven bolt, very high requirements in terms of response time and the torque capability of such motors have to be made. These requirements for electric motors rapidly lead to technological limits. If energy storage systems are used of a suitably strong design, such as for example sturdily designed spring systems possessing large spring hardnesses, correspondingly high resetting forces are required to re-tension the locking bolt against the spring force.

SUMMARY OF THE INVENTION

The invention is a mechanism by means of which a bi-directional displacement of a means along a guide becomes possible which preferably serves the purpose of reversibly fixed locking between two components. The displacement of the means both in the one and also in the opposite direction along the guide should take place quickly and in a short a time as possible while the technical effort required for this should preferably be low and weight-saving. The actuators displacing each of the means along the guide in opposite directions should more preferably have a high functional reliability so that they can be used in safety-relevant systems such as reversibly fixed locking in personal protection systems, be it in the passenger transport industry or in other fields in which the protection of persons is a priority.

According to the invention a device for a bi-directional displacement of a means or a connecting element, hereinafter referred to as means, along a guide, which can be reversibly moved between at least two positions along the guide, provides a driving means which can be engaged with the means along which the guide is capable of displacing the means in one direction while being subjected to the action of force and an actuator which is engaged with the means, which is capable of displacing the means in the opposite direction along the guide while being subjected to the action of force, wherein the actor unit can be actuated by means of a converter material.

Converter materials, more preferably multifunctional solid body converter materials, are for example piezo-ceramic, electro or magneto restrictive materials which are subjected to a change of state or form under the influence of a suitably controllable magnetic or electric field which mostly results in an increase in temperature, which can be deliberately utilized to provide a distance or force effect. The multifunctional material-specific process is characterized by very high dynamism, mechanical freedom of wear and setting accuracy and can be utilized within the framework of a suitably designed actuator for length or force change similar to the construction of a load unit utilizing a servo hydraulic actuator principle.

Precisely this effective mechanism, inherent in converter materials, is utilized for the deliberate displacement of the means movably mounted along a guide in the device of the invention. In addition to the actuator at least partly being a converter material, the device of the invention however provides for a further driving means which, in a simplest embodiment, is designed as an energy accumulator in a form of a tension or compression spring and can be engaged with the means such that the driving means is capable of displacing the means mounted along the guide in the opposite effective direction to that with which the means is displaced through the converter material supported actuator unit.

In a preferred application the device according to the invention serves for the locking and unlocking of two components mounted in a movable manner relative to each other where the locking process takes place through a positively guided movement along the guide in one direction and the unlocking process through a suitably force-guided movement of the means in the opposite direction. Depending on the application and constructional design of the device of the invention, it is possible to employ the actuator having the converter material or the driving means designed as an energy accumulator either for the locking or the unlocking operation.

Preferred areas of application of the device according to the invention can be seen for example in the field of motor vehicle construction, more preferably in connection with the improvement of personal protection in accident or crash situations. The device according to the invention for example can contribute to the mutual locking of individual regions of the vehicle structure or initiate the movement of individual vehicle components, such as moving vehicle seats from a working position into another working position, in which the vehicle seat for example is to be suitably arrested. Automotive or non-automotive applications of the device according to the invention are also conceivable where individual components are to be locked preferentially in a soft and reversible manner, that is in a non-destructive manner.

A particularly advantageous version of an actuator in a device according to the invention described above is formed in the way of a knee joint with at least two knee joint legs which are connected with each other in a rotatable manner via a pivot shaft. The end regions of the knee joint legs located opposite the pivot shaft are connected with the ends of a one-piece wire-shaped converter material, more preferably in form of a wire formed of shape memory metal, which is routed via a geometrical shape in the region of the pivot shaft and thus has a radial distance to the pivot shaft. Preferably the geometrical shape is designed as a circular disc having a circular center coinciding with the pivot shaft and a wire of converter material is routed at least in regions along the circumferential periphery. If the converter material is activated, more preferably by way of subjecting it to current or heating, it experiences a shortening in the longitudinal direction through which the knee joint end regions are spread apart. Further details in this regard can be taken from the description making reference to the exemplary embodiments.

BRIEF DESCRIPTION OF THE DRAWINGS

The invention is exemplarily described in the following without restriction of the general inventive idea by means of exemplary embodiments making reference to the drawings. It shows:

FIGS. 1a)-c) are a schematic sequence diagram representing the bi-directional displacement of a means;

FIGS. 3a) and 3b) are perspective detailed representations of a means designed as a locking element respectively in the unlocked (a) and locked (b) state as well as;

DETAILED DESCRIPTION OF THE INVENTION

In the sequential diagram representations according to the FIGS. 1a)-c) are a device for a bi-directional displacement of a means 1 designed according to the invention shown in a highly schematized way along a guide 2 wherein the guide 2 is a linear guide and the means 1 is connected with a fixed end support 4 via an actuator 3 designed as knee joint. Between the end support 4 serving as mechanical support and the means 1 movably arranged along the guide 2, a driving means 5 is provided having an energy accumulator in the simplest case constructed as spring element. Obviously it is possible to construct the driving means to have a pneumatically or hydraulically acting energy accumulator.

Figure 1:
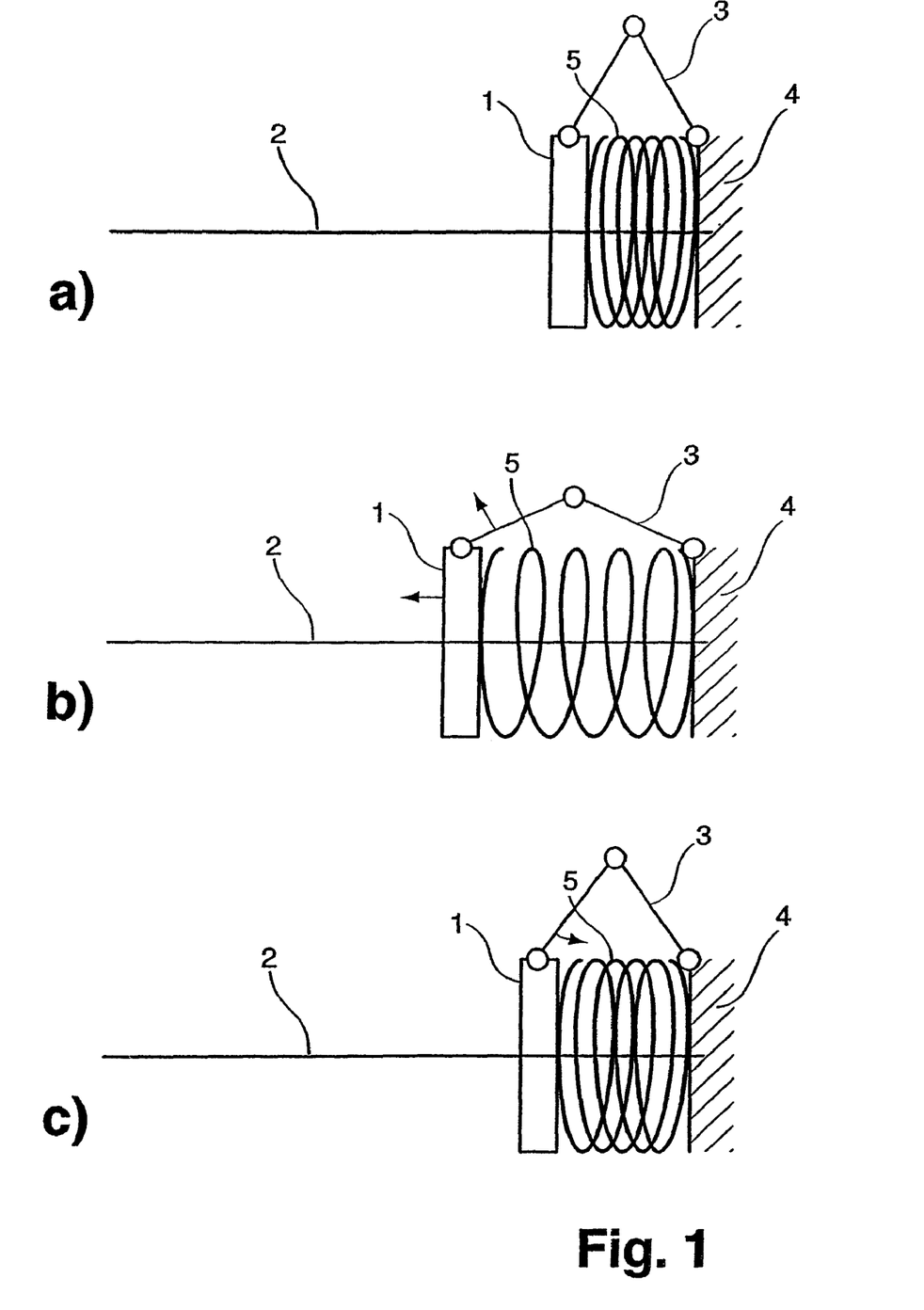

In FIG. 1 it is assumed that the driving means 5, that is the spring element, assumes a compressed state wherein a holding mechanism (not illustrated) holds the means 1 against the spring force of the spring element 5 in the right position shown in FIG. 1a. If the holding mechanism is released, the means 1 moves along the guide 2 formed as linear axis under the action of the spring force to the left while at the same time the actuator 3 constructed as knee joint is spread open in the manner as illustrated. In order to return the means from the displaced left position to the initial state shown in FIG. 1a following the expansion of the driving means 5 constructed as spring element, the actuator 3 constructed as knee joint is at least partly constructed of a functional converter material, or contains at least components of a corresponding converter material, preferentially of a shape memory metal alloy (SMA). Through suitable activation of the actuator regions or elements of the converter material, spreading of both legs of the knee joint 3 against the spring force of the driving means 5 acting between the means 1 and the mechanical stop 4 is initiated.

A possible design version of such a knee joint mechanism is explained in more detail in the following making reference to FIGS. 5a and b).

Alternatively to the operating mechanism for the bi-directional displacement of the means 1 along the linear guide 2 through combined interaction of a conventional energy accumulator as described in conjunction with FIGS. 1a)-c) preferentially in form of a spring element and an actuator constructed of at least in part regions of a converter material, it is likewise also possible to initiate the transfer of the means 1 from the position shown in FIG. 1a) to the position displaced to the left according to FIG. 1b) by means of deliberate force-imparting spreading of the actuator 3, wherein the spring element is transferred into a tensioned state. The resetting spring force serves for resetting the displaced means 1 to the initial position, wherein the converter material provided in the actuator 3 is deactivated and the actuator-conditioned force effect thus ceases.

The action principle described above in a particularly preferred application serves for the reversibly fixed locking and unlocking between two components. In this regard, reference is also made to the locking device shown in longitudinal section in FIG. 2. A sturdy sub-structure of a first component for example, serves as a mechanical fixed end support. A specific exemplary application from the motor vehicle sector is a sturdy body frame structure. On the fixed end support 4, a housing structure which is designed as a hollow cylinder shape, is fastened thereto which encloses a central axis A along which, as shown, has the means 1 designed as locking element which is guided in a linear manner.

Figure 2:
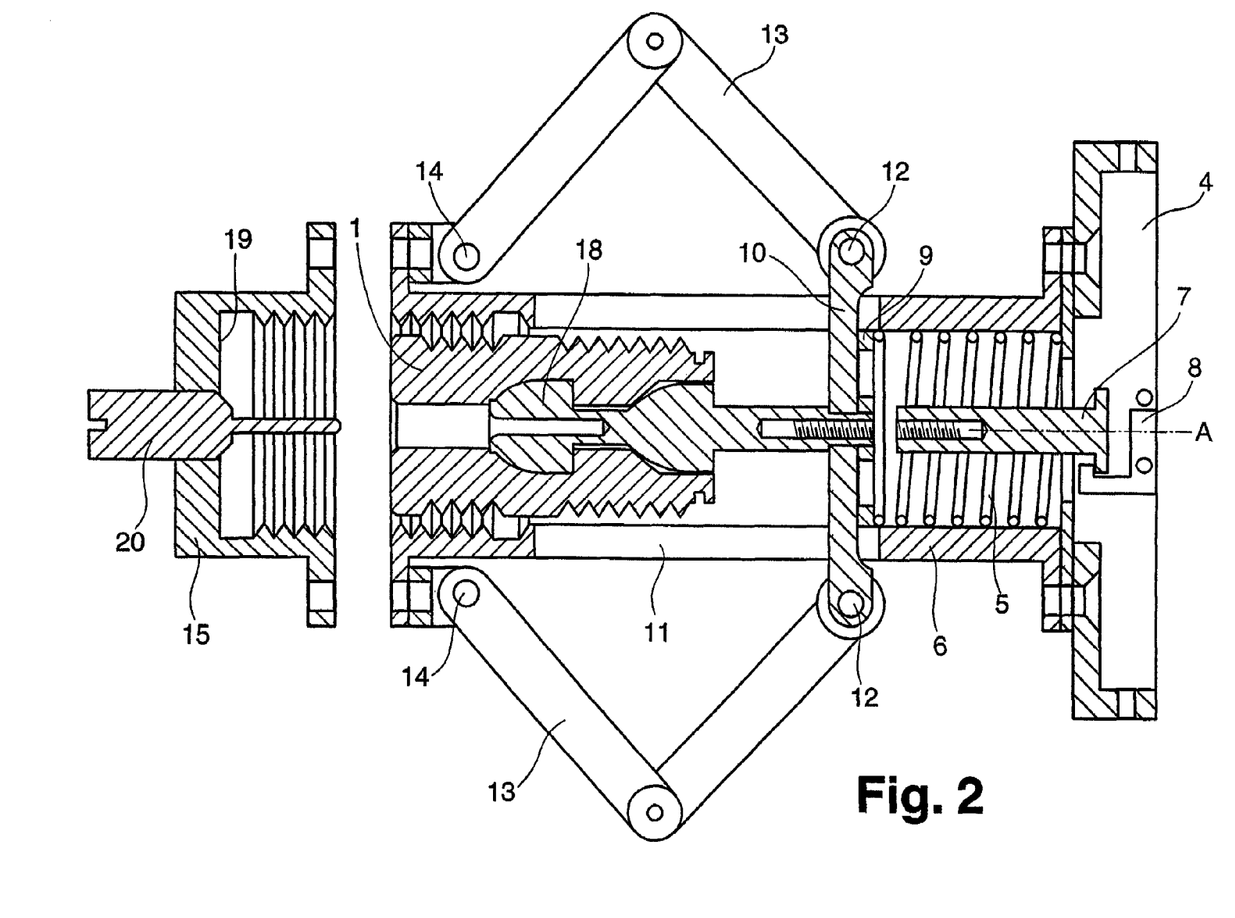
FIG. 2 is a longitudinal section representation through a device designed according to the invention for bi-directional displacement of a means.

On the inner wall within the housing structure 6, a cylinder-shaped compression spring, serving as driving means 5, is held in a preloaded state by a holding pin 7 which is engaged with a holding finger 8. The holding finger 8 is preferentially likewise held in a state which is engaged with the holding pin 7 by means of a wire of shape memory metal and is released from the holding pin 7 per activation of the converter material so that the spring energy of the compression spring 5 is liberated, in a process during which the spring relaxes along the central axis A in the direction facing away from the mechanical end support 4.

In doing so, the relaxing spring element 5 engages with a impact plate 9 which is connected with a support element 10 which protrudes from the housing structure 6 on both sides through a slot within the housing structure 6. At the ends of the support element 10 protruding from the housing structure 6, an end joint 12 is attached to a two-leg knee joint 13, which together serves as actuator and is articulated in a rotationally movable manner. The respective other end joint 14 of the two-leg knee joint 13 is articulated in a rotationally movable manner but in a fixed location on the housing structure 6 in a region facing away from the fixed end support 4. From this design, it follows that upon relaxation of the spring element 5, the knee joint 13 through the positively guided movement of the impact plate 9 and the support element 10 to the left is transferred into a closed position. Here, the end joint 12 is displaced along the central axis A in the direction of the end joint 14 which is at rest relative to the central axis A.

For resetting the relaxed spring element 5, the knee joint 13 has to be suitably activated, which knee joint is spread through support on the end bearing 14 against the spring force of the spring element 5 and is capable of transferring the spring element into a tensioned state. This is provided by a wire of SMA (shape memory material) with activatable length change characteristics being utilized for opening the knee joint 13. If the original state is reached, the holding finger 8 engages in a position holding the holding pin 7 by means of a detent.

To realize a locking function, the means identified with the reference number 1 of FIG. 1 has to be embodied as locking element. With reference to the exemplary embodiment shown in FIG. 2, the means 1 designed as locking means is connected with the support element 10 so that upon displacement of the support element 10, as described above. the locking element 1 is also moved simultaneously.

The action principle on which the locking mechanism is based is that the means 1 designed as a locking element, in a first position as shown in FIG. 2 has the spring element 5 assuming a tensioned state completely positioned within the cylindrical housing structure 6. Arranged axially spaced opposite the housing structure 6 is a cylindrical counter-housing structure 15 which for example is integrated in the region of a motor vehicle door. Through releasing of the holding finger 8 and the relaxation of the spring element 5 which follows thereafter, the locking element 1 emanates from the cylindrical housing structure 6 along the central axis A to the left (according to FIG. 2) and terminates in the interior of the cylindrical counter housing structure 15. At the same time the locking element 1 is subjected to radial spreading, as discussed below in detail with reference to FIG. 3. As a result of the radially expanding locking element 1 engages with the inner contour of both the housing structure 6 and also the cylindrical counter-housing structure 15. As is evident from the exemplary embodiment according to FIG. 2, the inner contours of the cylindrical housing structure 6, as well as the cylindrical counter-housing structure 15 in regions of engagement with the locking element 1, are designed as a jagged structure. The locking element 1 in each case has a jagged outer wall, designed in a counter-contoured manner, so that in the locked state the radially expanded locking element 1 closely claws into the inner contours of the cylindrical housing structure 6 and the cylindrical counter-housing structure 15. In this manner the cylindrical counter-housing structure 15 and the cylindrical housing structure 6 are firmly locked against each other along the central axis A.

Figure 3A:
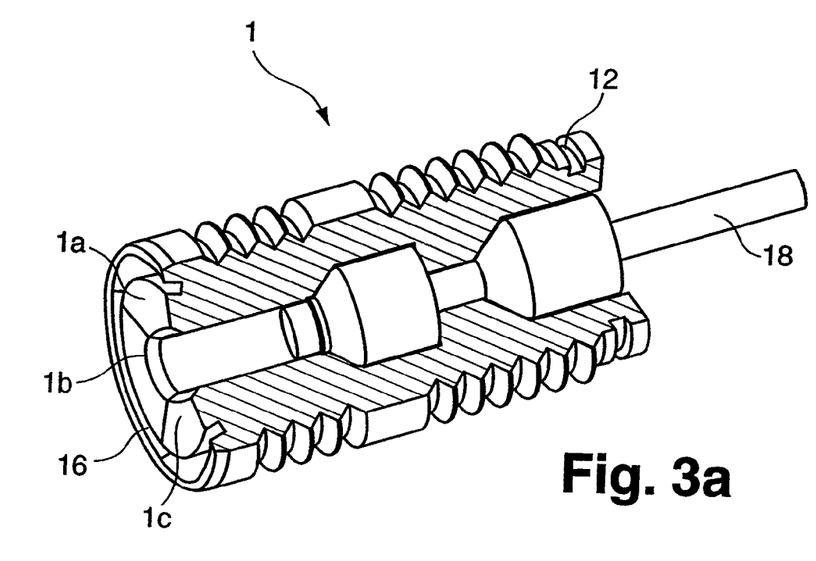
Figure 3B:
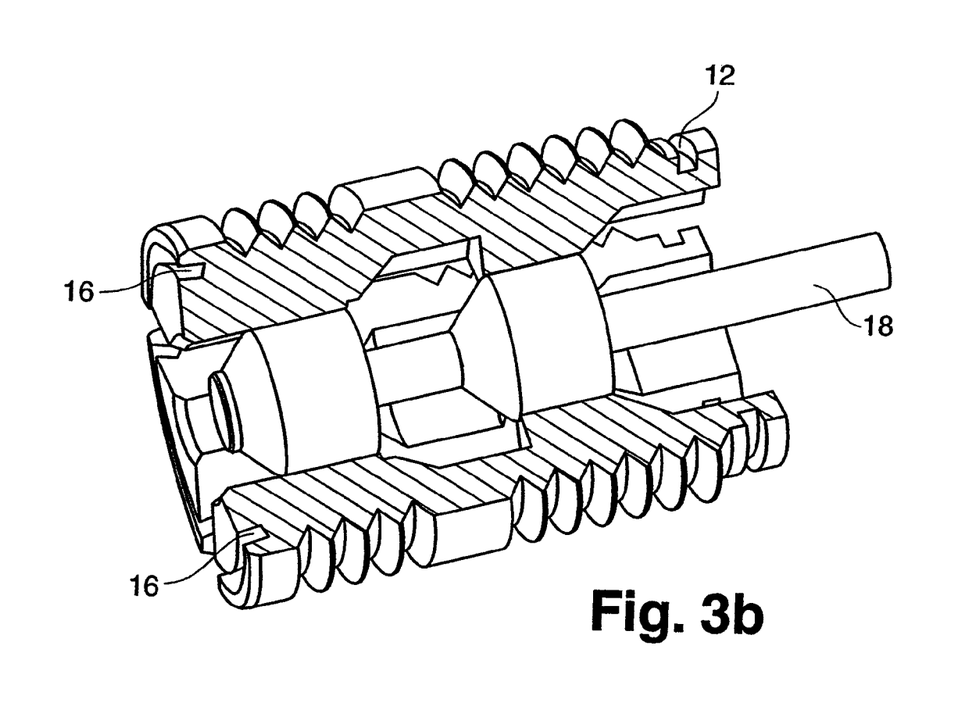

For improved illustration of the process of spreading of the locking element 1, reference is made to the FIGS. 3*a*) and *b*). In FIG. 3*a*) the locking element 1 is shown in the non-spread state, as shown in FIG. 2. The locking element 1 illustrated in the exemplary embodiment is divided into 4 segments (not illustrated), which in the assembled state shown in FIG. 3*a*) form a cylindrical-shaped locking element (for improved illustration of the construction of the locking element 1 a locking segment is not illustrated). All four segments of the locking element 1 are radially held together by means of rubber rings, not illustrated, each of which can be inserted in the mounting slots 16. Located inside the locking element 1 is a spreading pin 18, which upon suitable axial displacement, is capable of spreading the four segments (not illustrated) of the locking element 1 radially outward. The spread state is shown in FIG. 3*b*). The spreading action is evident by means of the inner contour of each individual segment (not illustrated) of the locking element 1 and the outer contour of the spreading pin 18, which is located on the inside and is pushed forward to the left relative to the locking element 1 along the central axis A.

If the locking element 1, which is divided into four segments, is displaced in the region of the cylindrical counter-housing structure 15 by means of spring force, the locking element 1 engages with the axially orientated stop surface 19 within the counter-housing structure 15 (see FIG. 2) and simultaneously a centering mandrel 20 connected with the counter-housing structure 15 enters a central recess within the locking element 1, which substantially serves for central guidance of the locking element 1. Further displacement under the effect of spring force in the axial direction of the support element 10 and the spreading pin 18 connected with the support element results in a situation shown in the FIG. 3*b*) in which the locking element 1 is radially spread open. Thus, close axial locking between the housing structure 6 and the cylindrical counter-housing structure 15 is created. If the locking state is to be released again, the knee joint 13 needs to be activated through which the support element 10 and the spreading pin 18 connected with the support element 10 is returned in a linear manner. Through the inner return of the spreading pin 18 within the locking element 1 into a position according to FIG. 3*a*), the radially spread segments (not illustrated) of the locking element 1 are transferred through the rubber elements provided in the mounting slots 16 into a compact form which is in mutual contact in which the locking element 1 can be returned in a linear manner from the region of the housing structure 15. Both components are thus unlocked again.

Figure 4A:
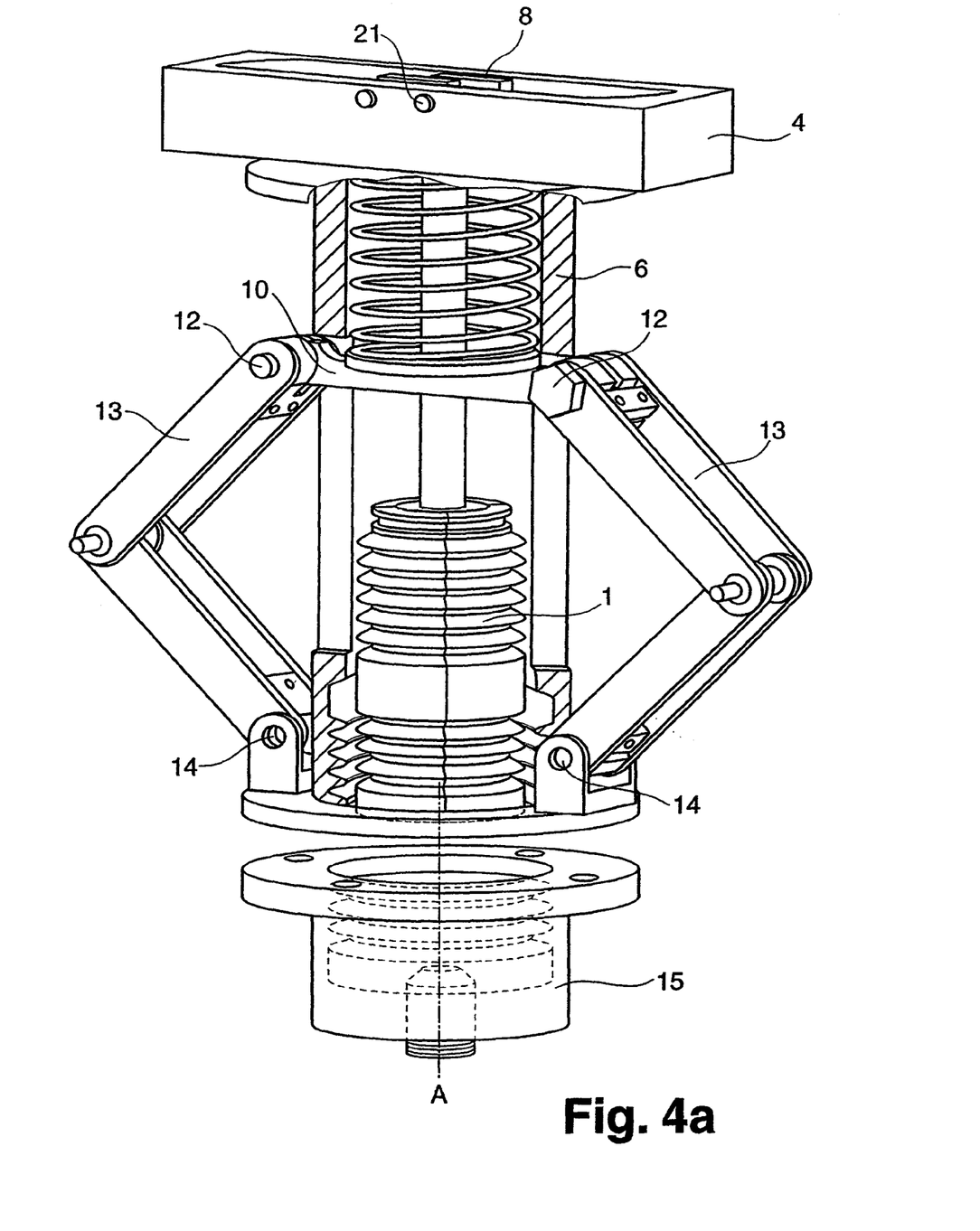
FIG. 4a) is a perspective representation of a locking element in the unlocked state.
Figure 4B:
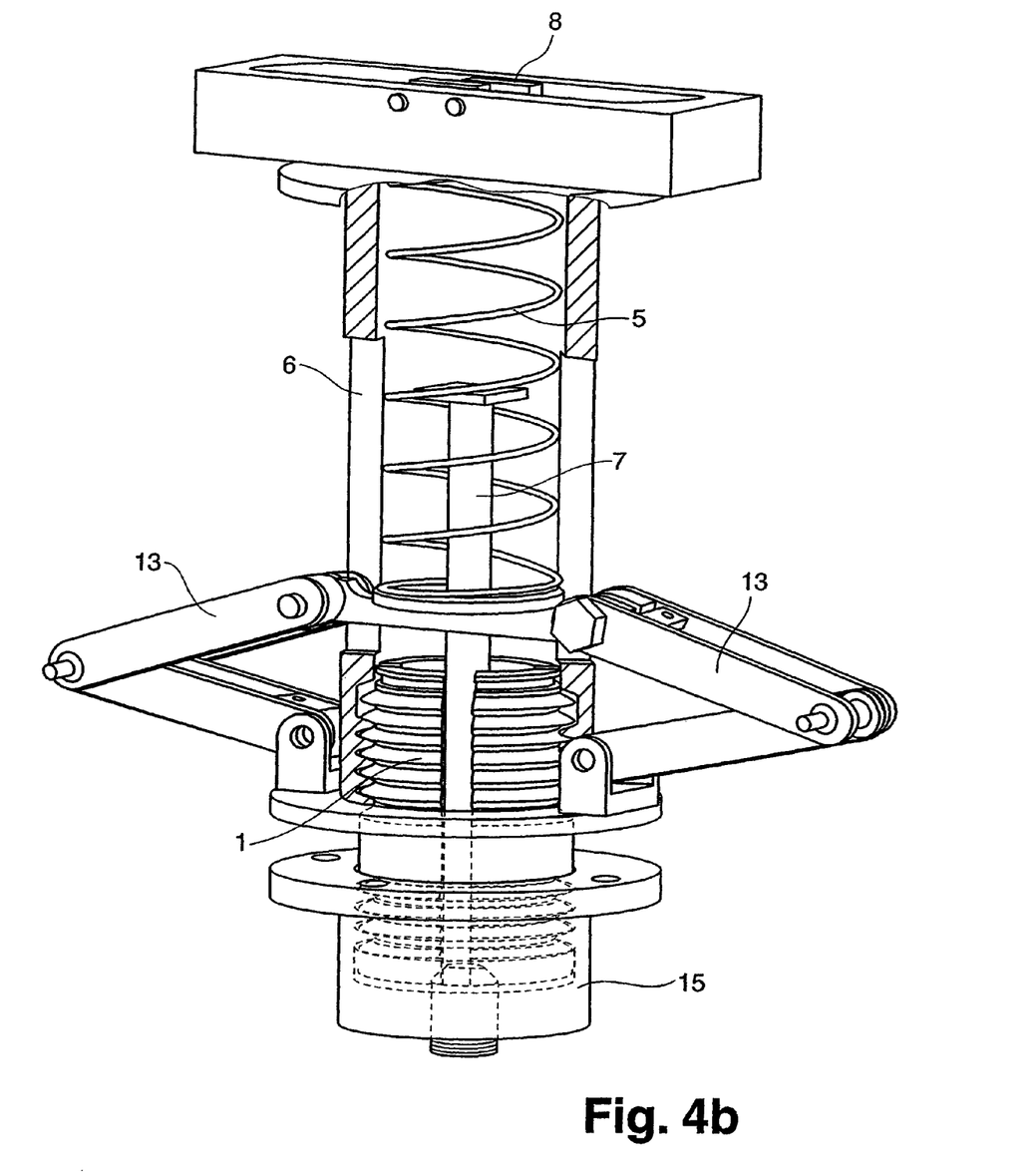
FIG. 4b) is a perspective representation of a locking element in the locked state.

For further illustration of the locking mechanism, reference is made to the FIGS. 4*a*) and 4*b*) which show the locking device represented in longitudinal section according to FIG. 2 in a perspective representation. FIG. 4*a*) represents the locking mechanism in the unlocked or opened state. The mechanical end support 4 is visible in which the holding finger 8 is introduced which can be activated through shape memory wires 21. On the end support 4, the housing structure 6 is attached within which along the central axis A and the spring element 5 is held in the tensioned state. Along the central axis A on a support element 10 protruding over the housing structure 6, each of the end bearings 12 of the two-leg knee joint 13 are attached in a longitudinally movable manner. The opposite end bearings 14 of the knee joints 13 are connected in a rotatably fixed manner with the housing structure 6. The locking element 1 is located in the interior of the housing structure 6 which remains in the radially closed state. Centrally opposite the cylindrical housing structure 6 the cylindrical counter-housing structure 15 is provided with an inner recess in which the locking element 1 is introduced in the locked state. The preferred embodiment integrates the housing structure 6, with all components firmly articulated to the housing structure, in a stable body region of a motor vehicle, whereas the housing structure 15 is provided for example in the region of the vehicle door. FIG. 4b) is illustrated in the locked state of the locking structure where the spring element 5 assumes a relaxed state. Here the holding pin 7 has been released from the holding finger 8. The knee joint 13 is in a closed state and the locking element 1 is radially spread (not visible) and firmly interlocks the housing structure 6 with the housing structure 15.

Returning the locking element 1 in the unlocked state activation of the knee joint 13 according to the invention is required such that the knee joint 13 is spread while being subjected to the action of force against the spring force of the spring element 5. To this end, the knee joint 13 according to the invention has a converter material, which is capable of spreading the two legs of the knee joint 13 while being subjected to the action of force. Such a knee joint mechanism is schematically shown in FIGS. 5a) and b).

Figure 5A:
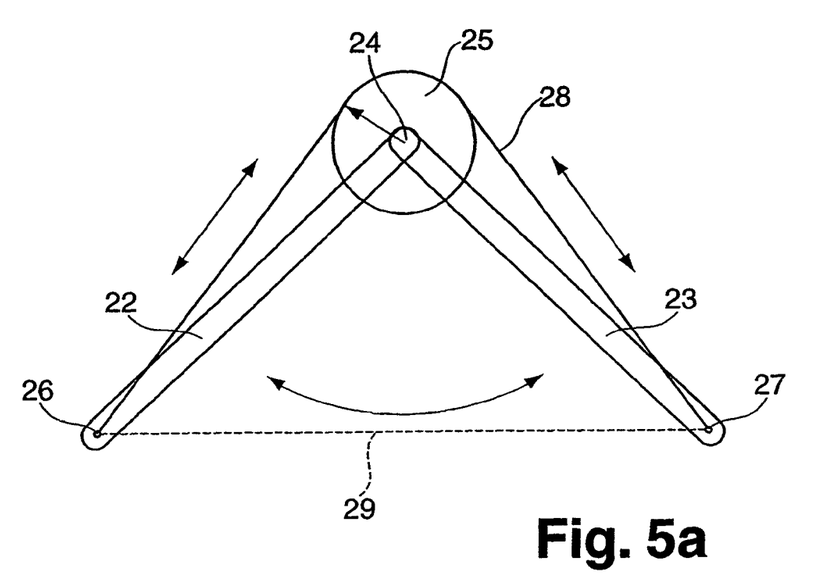
FIGS. 5a) and b) are schematic representations to an actuator designed as a knee joint.
Figure 5B:
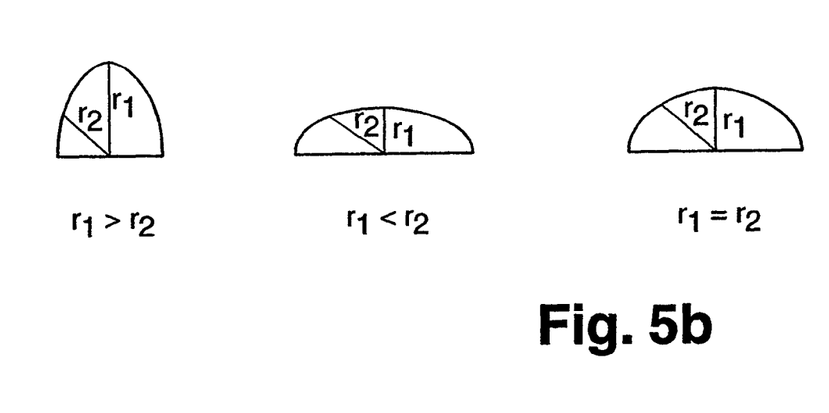

FIG. 5a) a shows a schematized representation of a two-leg knee joint 13 with two knee joint legs 22 and 23 connected with each other in a manner capable of swiveling via a one-shaft joint 24. Central to the joined axis which vertically intersects the drawing plane, of the one-axle joint 24, a circular disc-shaped geometrical shape 24 in form of a return roller is provided with a radius r. At the ends 26 and 27 of the knee joint legs 22 and 23, each of the end points of a one-piece wire 28 of shape memory material (SMA) are firmly attached, which wire otherwise is in contact with the peripheral outer contour of the return roller 25. The wire 28 in each case is stretched taut over the return roller 25 and upon a change in length brings about a corresponding spreading of the knee joint legs 22 and 23. If the wire 28 of shape memory material is shortened through corresponding activation, a torque is directed outwardly acting between wire 28 and the knee joint legs 22 and 23 because of the articulation points evident in FIG. 5a) which transfers the opened knee joint legs 22 and 23 into a spread that is the opened position.

This action mechanism is deliberately utilized to return the locking element 1 connected in the exemplary embodiment described above with the knee joint 13, from the locked state into the unlocked state against the spring force of the spring element. As a matter of principle, it is also possible however to employ the knee joint mechanism represented schematically in FIG. 5a) as an actuator element also for any other cases of application in which a movement guidance along a given trajectory is required.

For joining or closing both knee joint legs 22 and 23, an external introduction of force acting on both knee joint legs is required which, in the case of the exemplary embodiment described above, originates from the relaxing spring 5. In applications in which the knee joint mechanism represented in FIG. 5a) in single position is to be utilized as actuator acting in two directions, it is possible to enable closing of both knee joint legs 22 and 23 by means of a further wire 29 of shape memory material (see dashed line) which connects both articulation points 26 and 27 in a direct manner with each other. In this case, the wire 29 stretched between the articulation points 26 or 27 is suitably activated in a coordinated manner with the elongation of the wire 28 which runs over the return roller 25. In the case of the closing of both knee joint legs, the wire 28, which is stretched over the return roller 25, is lengthened whereas the wire 29 provided between the articulation points 26 and 27 has to be suitably shortened. Both wires thus have to be supplied with different energy sources and have to be activated suitably separated from each other.

In FIG. 5b) different circumferential geometries are shown for the geometrical shape of return roller 25 through which different force-distance curves, and thus different movement patterns of the knee joint ends 26 and 27, can be obtained. The different geometries differ through different radii ratios r1 and r2, wherein r1 corresponds to the radius directed vertically upward and r2 to the radius of the geometrical shape which applies at an angle of 45°.

The device according to the invention, using the knee joint system described above, makes possible a reversibility of the locking mechanism. The device opens up more preferably in applications with crash safety systems in the motor vehicle industry providing a tolerable acceptance of false trips of corresponding actuator systems. If for example using so-called pre-crash sensors an imminent collision is diagnosed, but which does not materialize however, the locking device according to the invention is triggered as a result of which the personal protection within the motor vehicle is increased but it is possible to release the locking protection again without causing damage to the vehicle proper.

If, however, pyrotechnical actuators are employed, the activation of such actuators unavoidably results in irreversible deformations on the motor vehicle proper. However, this should be avoided in all those cases in which a crash situation is detected but ultimately fails to materialize. The unlocking system according to the invention is capable of decisively contributing to totally avoiding the damages caused by false trips.

LIST OF REFERENCE NUMBERS

1 Means, locking element
2 Guide, central axis
3 Actuator
4 Mechanical end support
5 Driving means, spring element
6 Housing structure
7 Holding pin
8 Holding finger
9 Impact plate
10 Support element
11 Recess
12 End bearing
13 Knee joint
14 End bearing
15 Housing structure
16,17 Mounting slot
18 Spreading pin
19 Counter-stop surface
20 Centering mandrel
21 Wire of shape memory metal
22,23 Knee joint legs
24 Hinge joint
25 Geometrical shape, return roller
26,27 End regions of the knee joint legs, articulation points
28 Wire of SMA
29 Wire of SMA

The invention claimed is:

1. A device for a bi-directional displacement of a connecting element, along a guide, which is reversibly movable between at least first and second positions along the guide, comprising:
   means for driving which is engageable with a means for displacing the connecting element in one direction while being subjected to a force along the guide and an actuator engaging the connecting element for displacing the connecting element in an opposite direction along the guide while subjected to a force and wherein the actuator is activated with a converter material; wherein the connecting element comprises a locking element for first and second fixed components, the locking element being positionable in locked and unlocked states, wherein in the unlocked state the connecting elements I connected with the first fixed component via the actuator and an energy accumulator and is positioned in the first position along the guide when assuming the unlocked state and is positioned along the guide in the second position when assuming the locked state and includes second means, which upon displacement into the second position, enters into a reversibly fixed engagement with the second fixed component; and wherein: the locking element has at least two segments that are movable radially to the guide; a wedge element and a housing part radially surrounding the wedge element; and upon displacement of the locking element into the second position, the at least two segments are radially driveable outward by the wedge element to cause the segments to form a clamping connection with a housing radially surrounding the segments.

2. The device according to claim 1, wherein the guide is a linear axis or a curved trajectory.

3. The device according to claim 1, wherein the means for driving is an energy accumulator.

4. The device according to claim 3, wherein the energy accumulator is a mechanical, pneumatic or hydraulic energy accumulator.

5. The device according to claim 3 wherein the energy accumulator is a tension or compression spring.

6. The device according to claim 4 wherein the energy accumulator is a tension or compression spring.

7. The device according to claim 3, wherein energy accumulator is activated by a converter material which releases energy stored therein.

8. The device according to claim 4, wherein energy accumulator is activated by a converter material which releases energy stored therein.

9. The device according to claim 5, wherein energy accumulator is activated by a converter material which releases energy stored therein.

10. The device according to claim 6, wherein energy accumulator is activated by a converter material which releases energy stored therein.

11. The device according to claim 1, wherein the means for driving is an actuator comprising a converter material.

12. The device according to claim 1, wherein the actuator includes at least two leg knee joints with at least one leg knee joint being articulated and two end joints with one end joint being articulated with the connecting element and another end joint being on a fixed end support along the guide so the at least two leg knee joints are opened or closed by means of a converter material.

13. The device according to claim 12, wherein the converter material is a an SMA wire which runs along a leg of one of the two leg knee joints and is articulated on at least one articulation and the end joints comprise the SMA wire which on activation actuates one of the knee joints.

14. The device according to claim 1, wherein the means for driving on one side is articulated on a fixed end support along the guide and when activated engages with the means for driving.

15. The device according to claim 12, wherein the fixed end support is attached on one side to the actuator and the fixed end support on which the means for driving is articulated and is connected by a mechanical connection.

16. The device according to claim 1, wherein the at least two segments comprise:
   a resetting element which automatically returns the segments radially deflected outward into a radially inner position when the wedge element does not engage with the locking element.

17. The device according to claim 1 comprising:
   detachable lock for vehicle doors with a vehicle body in an event of a collision.

* * * * *